WORD SELECTION TECHNIQUE

Filed Aug. 2, 1962 3 Sheets-Sheet 1

PAUL E. WELLS
ALFRED D. SCARBROUGH
INVENTORS

BY Arthur Frelich

ATTORNEY

April 5, 1966 P. E. WELLS ETAL 3,245,060

WORD SELECTION TECHNIQUE

Filed Aug. 2, 1962 3 Sheets-Sheet 2

PAUL E. WELLS
ALFRED D. SCARBROUGH
INVENTORS

BY Arthur Friedrich

ATTORNEY

WORD SELECTION TECHNIQUE

Filed Aug. 2, 1962 3 Sheets-Sheet 3

INVENTORS
PAUL E. WELLS
ALFRED D. SCARBROUGH
BY
Arthur Freilich
ATTORNEY 3,245,060
WORD SELECTION TECHNIQUE Paul E. Wells, Los Angeles, and Alfred D. Scarbrough, Northridge, Calif., assignors to The Bunker Ramo Corporation, Stamford, Conn., a corporation of Delaware Filed Aug. 2, 1962, Ser. No. 214,227
9 Claims. (Cl. 340—174)

This invention relates generally to information storage systems and more particularly to selection means for use with memory apparatus of the type comprising a plurality of bistable elements, each capable of storing a binary digit, for enabling desired groups of said elements to be selected for reading information therefrom or writing information therein.

Information storage systems of the type capable of storing binary information find utility in data processing equipment, digital computing apparatus, process control installations and many other diverse applications. All of the known systems can be considered as falling within one of two major classes; namely, those with random and those with nonrandom access memories. Typical of the random access memories are those using single and multiple aperture magnetic cores, tunnel diodes, and cryotrons. Typical nonrandom access memories employ magnetic tapes, drums, discs, etc. The basic difference between these two major classes is best understood by a consideration of "access time." In random access memories, a fixed time interval (access time) is required to access the information or word from any one of a plurality of groups of elements or locations in the memory, the time interval being dependent solely on the characteristics of the system and being completely independent of the particular location accessed. In nonrandom access memories, the time interval required to access information depends upon where the information is physically located when the access operation is initiated; e.g., if the selected memory elements or cells on the surface of a magnetic drum have just passed the heads, the information will not be available until the drum has completed another full rotation (maximum access time). On the other hand, if information is just about to move under the heads when the access operation is initiated, it can be accessed almost immediately (minimum access time). It will be apparent that the average time required to access information from a nonrandom access memory is midway between the minimum and maximum access times.

Regardless of what type of memory is involved, some type of selection scheme is essential to provide access to a desired location in the memory. For example, in order to access information from a magnetic drum, it is necessary to know the address of the channel and sector of the drum in which the desired information is located. The proper channel is selected by choosing the read-write head physically associated with that channel. The proper sector is selected by counting each sector as it passes under the head. It can be appreciated that the channel selection can be considered a space selection while the sector selection can be considered a time selection. Selection schemes associated with other moving storage mediums, such as tapes and discs, similarly select a location by a combination technique emoloying space and time selection.

Inasmuch as time selection is, of course, not applicable to non-moving random access mediums, selection must be accomplished solely by space selection techniques. Numerous such techniques have been developed. Perhaps the most common of these techniques is the half select or coincident current scheme. With this scheme, the storage elements, e.g., single aperture magnetic cores, are arranged in a three-dimensional coordinate system; the X and Y coordinates of a core representing the address of the word of which that core is a member and the Z coordinate determining which bit of the word the core stores. Thus, a single column of cores (i.e., all cores with the same X and Y coordinates) represents a single word. The wiring provided is so arranged that all cores with the same X, Y, or Z coordinates have the same X, Y, or Z wire threaded through them. The X coordinate wires are the outputs of current drivers connected to a decoding circuit that decodes half the bits of an address. Similarly, the Y coordinate wires are outputs of current drivers connected to a decoding circuit that decodes the other half of the bits of the address. The Z wires are the parallel input to a data register. A full valued current $+I_C$ (i.e., a current having a magnitude sufficient to switch a core) through the wires threaded through a core cause the core to assume a first state representing a binary "1" while a current $-I_C$ cause the core to assume a second state representing a binary "0." To select a word with this system, a current of $-\frac{1}{2}I_C$ is passed through the X wire corresponding to the X half of the desired address. Another current of $-\frac{1}{2}I_C$ is passed through the Y wire corresponding to the Y half of the address. Only cores in the proper X, Y column will then have the full current $-I_C$ passing through them and of these cores only those which are storing a binary "1" will switch states while the cores storing a binary "0" will be unaffected. Therefore, only the Z wires through those cores which switch will have a voltage induced therein effective to operate the associated stages of the data register. A similar selection procedure is used to write information into the memory.

Although the coincident current scheme is probably the most widely utilized for random access memory selection, certain inherent disadvantages of the system are well recognized. Initially, since coincidence of the half value X and Y currents are necessary to switch a core, the magnitude of these currents must be precisely controlled in order to prevent the inadvertent switching of cores through which only one of the energized X and Y wires pass. In other words, if the magnitude of the current in the X wire were permitted to drift up to full value, all of the cores through which this X wire passed would be switched, rather than merely the cores through which both the energized X and Y wires passed. Since the magnitude of the drive currents is limited the switching time of the cores, which is related to the drive currents, is also limited. Further, inasmuch as the X and Y drive currents are driven through cores which are not to be selected, the signal to noise ratio of the system is adversely affected since the drive currents passing through several nonselected cores tend to establish an undesirable noise level. A further undesirable feature of the systems using a coincident current selection technique is the requirement that the characteristics of all of the cores be maintain within a close tolerance. This requirement is apparent when it is recalled that a half valued drive current is not supposed to switch a core but a full valued drive current is.

In light of the disadvantages of the coincident current selection techniques, the utilization of word organized memories has been suggested. A word organized memory is one which is electrically organized into words such that the memory elements storing a given word are read by driving a current through a single selection element associated with that word, rather than by driving fractional currents through a pair of selection elements as in a coincident current selection scheme. It should be appreciated that by dedicating a single selection element or drive wire to all of the elements of a word, several disadvantages of the coincident current selection scheme are avoided. More particularly, since the cores can be driven harder when reading, reading times are minimized and since each drive wire is only threaded through cores that are to be selected when that drive wire is energized, no undesirable noise level is established. Moreover, the requirement for close tolerances is somewhat relaxed.

Despite these recognized advantages of word organized memories, to date they have not been extensively adopted because they require the addition of a word selection switch in order to select the desired word line. Moreover, since existent word selection switch designs require some combination of M drivers and P switches, both necessarily being bidirectional, where $MXP=N$, N being the total number of words in the memory system, the cost of a word organized memory is relatively high.

In view of this, it is a general object of this invention to provide a simpler and less costly selection switch than heretofore known for use in word organized memories.

Briefly, the invention herein is based on the recognition that the number of drivers normally required in heretofore known word organized memory selection switches can be considerably reduced by employing in place thereof a single pair of current sources and associated switching elements and arranging the switching elements in a pair of cascaded coordinate arrays.

In a preferred embodiment of the invention, single aperture magnetic cores are used for switching purposes and arranged such that in a balanced memory of N words, a pair of coordinate arrays of switching cores, each array including $N^{1/2}$ cores is utilized. The N words of the memory itself can be considered as divided between P banks, each bank containing M words. The term "balanced" is here used to refer to a memory wherein $M=P$. In an unbalanced memory ($M \neq P$) one of the arrays would include M cores and the other P cores. Each of the M cores is uniquely associated with the corresponding word in each of the P banks while each of the P cores is uniquely associated with one of the banks.

A bias winding is formed on each of the switching cores to establish a quiescent state which will arbitrarily be considered as binary 0. Half of the bits in the memory address register are used to select one of the switching cores in a first of the arrays while the other half of the bits in the register are used to select one of the switching cores in a second of the arrays.

A read winding and a write winding are formed on each of the switching cores in the first array. Pairs of oppositely poled diodes are respectively connected between the read and write windings and a word line. Each word line is, of course, threaded through all of the memory cores of the corresponding word and connected to a winding on one of the switching cores in the second array.

Selection of switching cores in the first and second arrays switches the selected cores to binary 1 and induces a voltage in the read winding on the first array core so as to forward bias one of the diodes connected thereto. Concurrently, a switching core in the second array is switched. By then energizing a first current source connected to all of the switching core read windings, a resulting read current is steered through the forward biased diode and along to its associated word line to permit the word stored in the cores of the associated memory location to be read. Upon de-energization of the selected switching cores, the bias winding causes them to revert back to their binary 0 state. This latter switching action forward biases the diode connected to the write winding on the switching core of the first array thereby permitting a second current source, connected to all of the write windings, to drive a write current along the word line connected to the forward biased diode to write information into the cores of the associated memory location.

Other objects and advantages, which will subsequently become apparent, reside in the details of circuitry and operation as more fully hereinafter described and claimed, further reference being made to the accompanying drawings forming a part hereof, wherein like identifying numerals refer to like parts throughout the several figures, and in which:

FIGURES 1(*a*) and 1(*b*) illustrate in detail a portion of a core memory array showing in (*a*) the manner in which information is read from the cores of a word location and showing in (*b*) how information is written therein;

FIG. 4(*a*) illustrates the hysteresis loop of a switching core used in the selection switch of FIG. 4 showing the effects of various currents on the core.

Figure 1A:
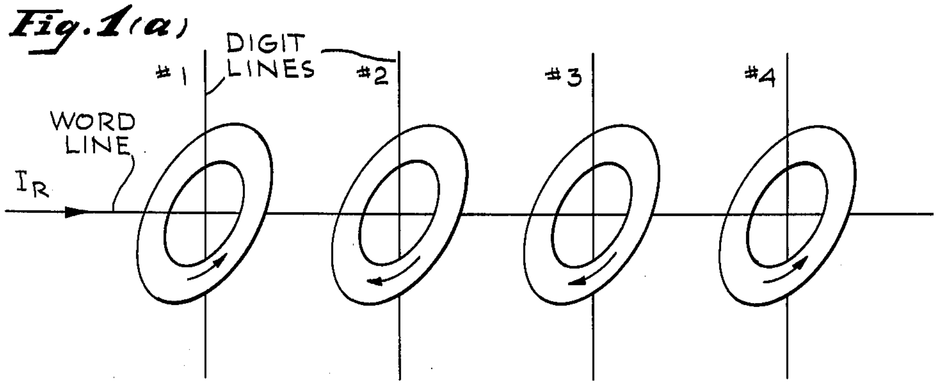
Figure 1B:
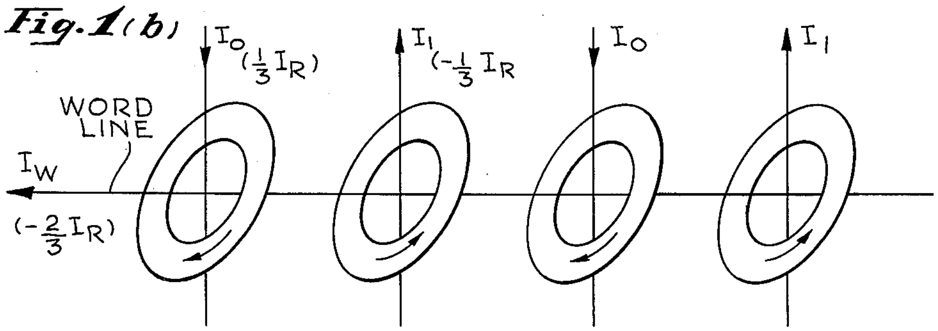

With continuing reference to the drawings, initial attention is called to FIG. 1 wherein a portion of a core memory array is illustrated. For simplicity in explanation, each word location in the exemplary memory system to be herein considered will include four memory cores and thereby be capable of storing a four-bit binary word. Assume initially that the flux in the cores is oriented in the manner shown in FIG. 1(*a*). If a clockwise magnetization is considered to represent a binary 0 and a counterclockwise magnetization a binary 1, it can be seen that the contents of the illustrated word location are 1001. In order to read out the contents, a current $I_R$ having a magnitude equal to that necessary to switch a core can be driven through the word line threading the cores to cause the flux in each core to assume a clockwise direction. Accordingly, cores 1 and 4 will switch thereby inducing an output voltage on their respective digit lines. Since cores 2 and 3 were already magnetized in a clockwise direction, they will not switch and no output voltage will be induced on their digit lines.

In order to write a new word into the cores which are now all magnetized in a clockwise direction; e.g., 0101, a current $I_W$, having a magnitude equal to two-thirds that necessary to switch the core, is driven through the word line in a direction opposite to the direction that $I_R$ had been driven. Simultaneously a current $I_1$ having a magnitude equal to one-third that necessary to switch the core, is applied to the digit lines of cores 2 and 4. While a current $I_0$ of the same magnitude as $I_1$ but opposite in direction is applied to the digit lines of cores 1 and 3. Currents $I_W$ and $I_1$ each tend to orient the flux in a counterclockwise direction while current $I_0$ tends to orient the flux in a clockwise direction. It is apparent that only cores 2 and 4 will switch and as a result the cores will assume the states shown in FIG. 1(*b*).

Figure 2:
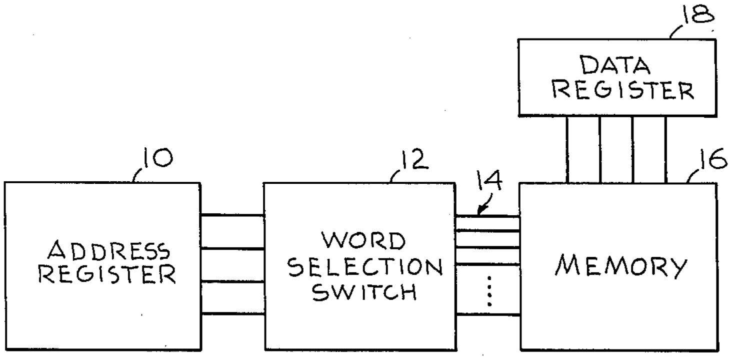
FIG. 2 is a block diagram generally illustrating a word organized memory system.

Whereas in a coincident current memory system, selection of a particular word location for reading is made only when a pair of windings on a core are coincidentally energized, it can be seen that in a word organized memory system, reading occurs under the influence of a current driven through a single word line. Attention is now drawn to FIG. 2 wherein is illustrated a block diagram of a typical word organized memory. Generally, in operation, an address is written into an address register 10 and decoded by a word selection switch 12 which in turn energizes the appropriate word line 14 associated with that address. As indicated, each word line 14 is associated with all the cores of one word location in the memory 16 and only with cores in that word location. By driving appropriate read and write currents along the selected word line, information is either read out from or into the data register 18.

Figure 3:
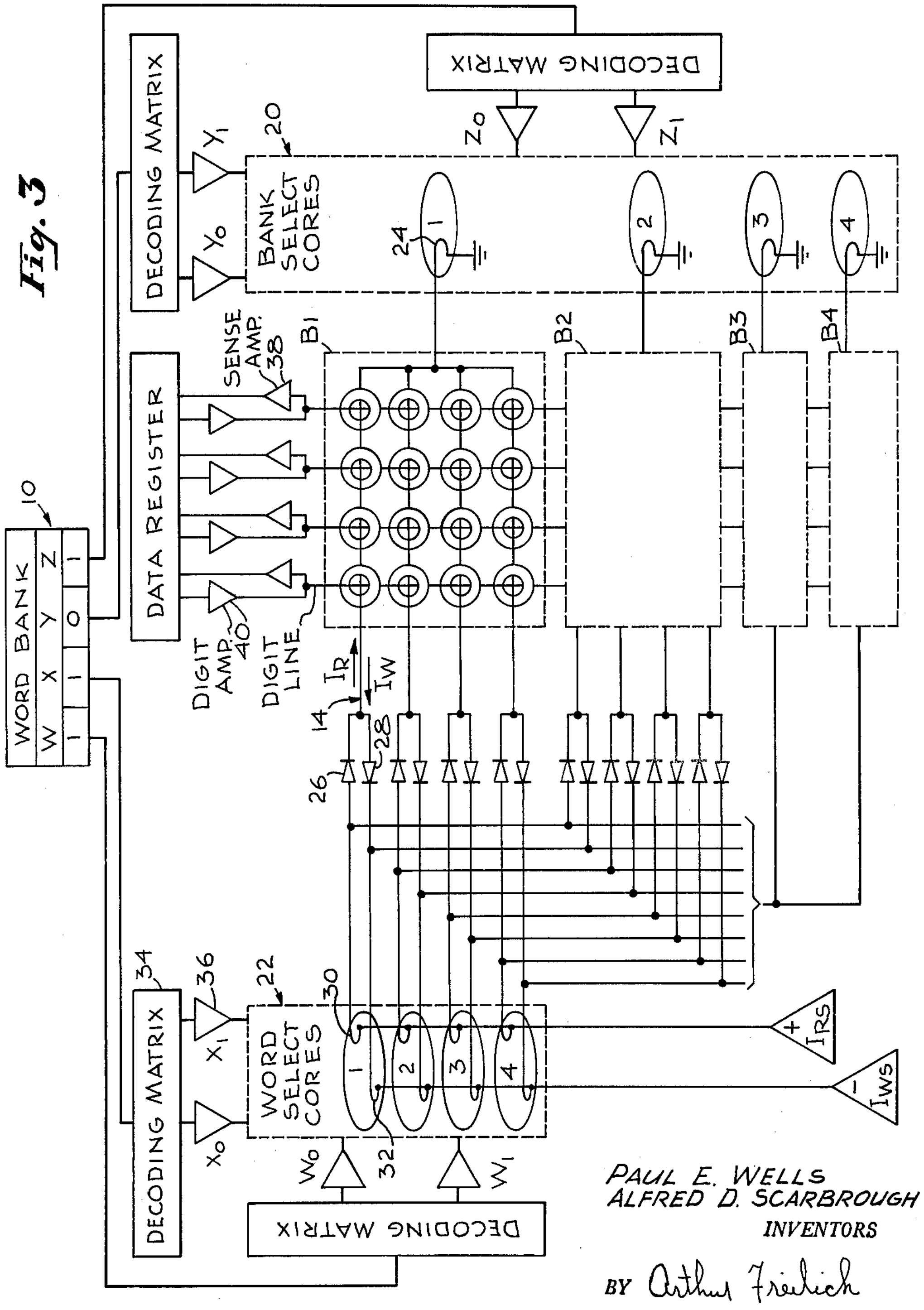
FIG. 3 is a schematic diagram illustrating the relationship between the word selection switch comprising the present invention and the other elements of the memory system.

Continuing reference is now made to FIG. 3 wherein the relationship between the word selection switch 12 comprising the present invention and the other elements of the word organized memory are illustrated. For exemplary purposes, it will be assumed that the memory capacity is 16 words, each 4 bits in length. The 16-word locations can be considered as being divided equally into four memory banks B1, B2, B3, B4, each having four word locations. Accordingly, in order to select a particular word location out of the 16-word locations available, it is necessary to designate the memory bank in which the location resides together with the location number in that bank.

In order to select a memory bank and a word location therein, respective arrays 20, 22 of bank select and word select switching cores are provided. A word line 14 unique to each word location is threaded through the cores of that word location and is connected between a winding 24 on a bank select switching core and a pair of oppositely poled diodes 26, 28 which are in turn respectively connected to a pair of windings 30, 32 on a word select switching core. Selection of one word select switching core and one bank select switching core and correspondingly a word line is governed by the address information stored in the address register 10 coupled through decoding matrices 34 and drivers 36 to the bank and word select switching core arrays 20, 22.

Selection of a pair of select switching cores, one from each array, permits read and write currents, $I_R$ and $I_W$ respectively to be driven through the selected switching cores from the respective current sources $I_{RS}$ and $I_{WS}$. Concurrent with the driving $I_R$, the sense amplifiers 38 can be energized to read out while concurrent with driving $I_W$, the digit amplifiers 40 can be energized to write information into the cores.

Figures 4, 4A:
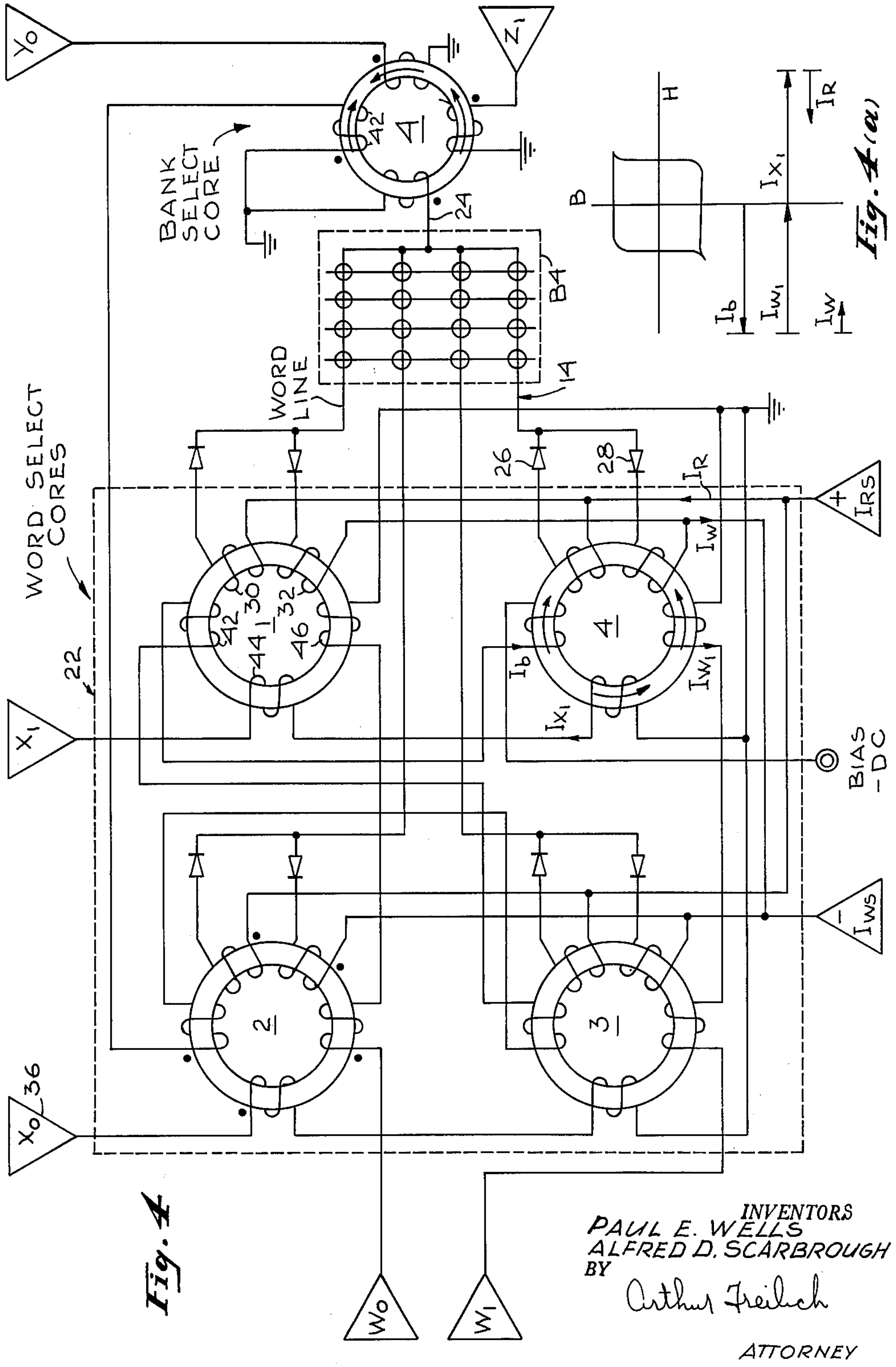
FIG. 4 is a schematic diagram illustrating in greater detail the word selection switch.

Attention is now called to FIG. 4 wherein the details of the word select switching core array 22 are illustrated in conjunction with the memory cores of one memory bank B4 and its associated bank select switching core. The bank select switching core illustrated is one of the array 20 of bank select switching cores, the array 20 being similar to the word select switching core array 22 illustrated.

The word select switching core array 22 includes four cores, one corresponding to each word in every memory bank. Wound on each core is a D.-C. bias winding 42 connected between a negative voltage source and ground. The bias windings 42 on all of the cores can be connected in series as illustrated. The current $I_b$ driven through the bias winding 42 establishes a magnetic field in the core in the clockwise direction illustrated. Likewise, the bias winding on the bank select switching core illustrated establishes a clockwise magnetic field therein.

In addition to the bias winding 42, a pair of selection windings 44, 46 are disposed on each switching core. Each of the selection windings is connected between a negative current driver 36 and ground with the selection windings being so arranged that each core has a unique pair of drives associated with it. As previously pointed out, the drivers 36 are controlled by the decoding matrices 34 in accordance with the address information in address register 10. That is, e.g., if bits 1 and 2 of register 10 store a binary 1, then upon generation of appropriate control signals, drivers W1 and X1 will respectively drive currents $I_{W1}$ and $I_{X1}$ through the windings attached thereto such that their combined effect is sufficient to overcome the bias current $I_b$ and switch a core. For a clearer understanding of this switching, attention is called to FIG. 4(*c*) wherein the effects of the currents are illustrated with respect to the hysteresis loop of a core. Accordingly, although currents $I_{W1}$ and $I_{X1}$ will be driven through windings associated with word select switching cores 1, 3 and 4, only switching core 4 will be caused to switch. Concurrent with the selection of the word select switching core, a bank select switching core is similarly switched in accordance with the address information stored in bits 3 and 4 of the address register 10.

In addition to the bias and select windings on each of the word select switching cores, read and write output windings 30, 32 are disposed thereon. The read output winding 30 is connected between current source $I_{RS}$ and the anode of diode 26. The write output winding 32 is connected between current source $I_{WS}$ and the cathode of diode 28. The cathode of diode 26 and anode of diode 28 are connected together and to a word line 14 uniquely associated with the switching core upon which they are wound. All of the word lines are connected together on the far side of the memory bank and are connected to winding 24 on the bank select switching core uniquely associated with the bank through which the word lines are threaded.

In operation, the word in a memory location is accessed by storing the address of the location in the address register 10. Upon the generation of appropriate control signals, a pair of word select switching core drivers and a pair of bank select switching core drivers are energized in accordance with the address information respectively stored in bits 1 and 2 and bits 3 and 4 of the address register. Energization of the word and bank select drivers causes the flux in one of the word select and one of the bank select switching cores to reverse, i.e., to be oriented in a counterclockwise direction as is illustrated in FIG. 4(*a*). Assuming the address information to be that illustrated in the register 10 in FIG. 3 and the drivers and switching cores arranged as illustrated, word select switching core 4 and bank select switching core 4 will be switched. The switching of these cores induces a voltage in the read output winding 20 on word select switching core 4 of a polarity (positive on the anode and negative on the cathode of diode 26) and magnitude to forward bias the diode 26 associated therewith. After a suitable delay, on the order of .2 μsec., current source $I_{RS}$ is energized thereby driving a current $I_R$ through the read output winding associated with the only forward biased diode 26, the word line connected thereto, and through winding 24 to ground. As discussed in connection with FIG. 1, this causes the information stored in memory location 4 in memory bank B4 to be read out into data register 18. It will be noted from FIG. 4(*a*) that current $I_R$ tends to aid bias current $I_b$ and in view of this the combined effect of currents $I_{W1}$ and $I_{X1}$ must be sufficient to overcome the effects of currents $I_b$ and $I_R$ and switch the core.

In a destructive memory, such as the type using single aperture magnetic cores, it is necessary to write information into the memory after it is read out. In order to do this, advantage is taken of the de-energization of the drivers energized in conjunction with the reading function. More particularly, when the drivers W1 and X1 associated with word select switching core 4 and the drivers $Y_0$ and $Z_1$ associated with the bank select switching core 4 are de-energized, the bias windings 42 on the cores cause the flux therein to reverse and assume a clockwise direction. It can be seen that this switching action forward biases diode 28 by virtue of the voltage induced in the write output winding on word select switching core 4 and winding 24 on bank select switching core 4. Accordingly, after a suitable delay, on the order of a .2 μsec., current source $I_{WS}$ is energized to drive a current $I_W$ through the associated word line to thereby write the information stored in the data register into the memory cores associated with that word line.

From the foregoing it should be realized that the word select and bank select switching cores perform a switching function permitting them to sequentially handle the oppositely directed and dissimilar magnitudes of the read and write currents. As a consequence, word selection is accomplished with a minimum of equipment at a minimum expense.

The foregoing is considered as illustrative only of the principles of the invention. Since numerous modifications will readily occur to persons skilled in the art, it is not desired to limit the invention to the exact construction and operation shown and described and accordingly all suitable modifications and equivalents are intended to fall within the scope of the invention as claimed.

The following is claimed as new:

1. In combination with an address register and a plurality of groups of memory elements, each group having a word line associated therewith, selection means for selectively energizing said word lines in accordance with information stored in said address register comprising:

an electrical energy source;

first and second coordinate arrays of normally open switches;

means connecting each of said word lines to a unique pair of said switches icluding one switch from each array;

decoding means selectively closing one switch in each of said arrays in accordance with said information in said address register; and means coupling said electrical energy source to all of said switches to thereby energize the word line uniquely connected to said selectively closed switches.

2. The combination of claim 1 wherein coincident current means are employed between said decoding means and said switch arrays for selectively closing said switches.

3. In combination with an address register and a plurality of groups of memory elements, each group having a word line associated therewith, selection means for selectively energizing said word lines in accordance with information stored in said address register comprising:

first and second electrical energy sources;

first and second coordinate arrays of normally open bidirectional switches;

means connecting each of said word lines to a unique pair of said switches including one switch from each array;

decoding means selectively closing one switch in each of said arrays in accordance with said information in said address register; and means sequentially coupling said electrical energy sources to all of said switches to sequentially oppositely energize the word line uniquely connected to said selectively closed switches.

4. In combination with an address register and a plurality of groups of memory elements, each group having a word line associated therewith, selection means for selectively energizing said word lines in accordance with information stored in said address register comprising:

first and second electrical energy sources;

first and second coordinate arrays of normally open bidirectional switches;

means connecting each of said word lines in series with a unique pair of said switches including one switch from each array;

decoding means selectively closing one switch in each of said arrays in accordance with said information in said address register; and means sequentially coupling said electrical energy sources to all of said switches to sequentially oppositely energize the word line uniquely connected to said selectively closed switches.

5. The combination of claim 4 wherein coincident current means are employed between said decoding means and said switch arrays for selectively closing one switch in each of said arrays.

6. The combination of claim 4 wherein said normally open switches comprise bistable magnetic cores biased to a first state;

a pair of windings on each core connected to said decoding means and capable, upon energization, of switching said cores to a second state;

a read winding on each of said cores of said first array;

a write winding on each of said cores of said first array;

first and second oppositely poled diodes connected respectively between the read and write windings of each of said cores and each of the word lines associated therewith whereby a voltage is induced in said read winding when a pair of cores switch from said first to said second state to forward bias said first diode and a voltage is induced in said write winding when said cores switch from said second to said first state to forward bias said second diode to thereby enable said first and second electrical energy sources to sequentially oppositely energize the associated word line.

7. In combination with an address register and a plurality of memory elements arranged in P banks, each bank including M groups of memory elements and each group of elements having a word line uniquely associated therewith, selection means responsive to information stored in said address register for selecting one of said word lines, said selection means including:

a first selection matrix comprised of M binary elements each capable of defining first and second states;

a second selection matrix comprised of P binary elements each capable of defining first and second states;

M pairs of oppositely poled first and second unidirectional circuit elements;

means connecting each of said pairs of circuit elements to a different one of said first selection matrix binary elements;

means uniquely connecting each of said word lines between one of said pair of circuit elements and one of said second selection matrix binary elements;

means biasing all of said binary elements in said first and second selection matrices to a first state;

means responsive to information stored in said address register for applying signals to said selection matrices for switching one binary element in each of said first and second selection matrices to a second state to thus forward bias the first unidirectional circuit element connected therebetween;

a read current source; and means for coupling said read current source to all of said first unidirectional circuit elements to thereby drive a current through the word line connected to said forward biased first unidirectional circuit element.

8. The combination of claim 7 including means for terminating the application of said signals responsive to said information stored in said address register whereby said bias means will switch said selection matrix binary elements in a first state to said second state to thus forward bias the second unidirectional circuit element connected therebetween;

a write current source; and means for coupling said write current source to all of said second unidirectional circuit elements to thereby drive a current through the word line connected to said forward biased second unidirectional circuit element.

9. The combination of claim 8 wherein each of said selection matrix elements comprises a magnetic core and said first and second unidirectional circuit elements respectively comprise first and second diodes;

a first winding on each of said first selection matrix cores coupled to the first diode of the pair of unidirectional elements coupled thereto; and a second winding on each of said first selection matrix cores coupled to the second diode of the pair of unidirectional elements coupled thereto.

References Cited by the Examiner

UNITED STATES PATENTS 3,007,141 10/1961 Rising ............ 340—174

IRVING L. SRAGOW, *Primary Examiner.*